United States Patent
Andersen et al.

(10) Patent No.: US 9,441,433 B2
(45) Date of Patent: Sep. 13, 2016

(54) REMOTELY ACTUATED CLAMPING DEVICES FOR BOREHOLE SEISMIC SENSING SYSTEMS AND METHODS OF OPERATING THE SAME

(71) Applicant: Avalon Sciences Ltd, Somerset (GB)

(72) Inventors: James K. Andersen, Westlake Village, CA (US); Afshin Kianpour, Northridge, CA (US); Eric L. Goldner, Valencia, CA (US)

(73) Assignee: Avalon Sciences, Ltd (GB)

( * ) Notice: Subject to any disclaimer, the term of this patent is extended or adjusted under 35 U.S.C. 154(b) by 361 days.

(21) Appl. No.: 14/115,665

(22) PCT Filed: Jul. 29, 2013

(86) PCT No.: PCT/US2013/052476
§ 371 (c)(1),
(2) Date: Nov. 5, 2013

(87) PCT Pub. No.: WO2014/018959
PCT Pub. Date: Jan. 30, 2014

(65) Prior Publication Data
US 2014/0246210 A1    Sep. 4, 2014

Related U.S. Application Data

(60) Provisional application No. 61/676,565, filed on Jul. 27, 2012.

(51) Int. Cl.
*E21B 17/10* (2006.01)
*E21B 23/04* (2006.01)
(Continued)

(52) U.S. Cl.
CPC ........... *E21B 23/01* (2013.01); *E21B 17/1021* (2013.01); *E21B 23/04* (2013.01); *G01V 11/005* (2013.01); *G01V 2001/526* (2013.01)

(58) Field of Classification Search
CPC ......................... E21B 17/1021; G01V 11/005
See application file for complete search history.

(56) References Cited

U.S. PATENT DOCUMENTS

| 2,846,662 A | 8/1958 | Sparks |
| 3,474,539 A | 10/1969 | Moore |

(Continued)

FOREIGN PATENT DOCUMENTS

| CN | 2643296 | 9/2004 |
| CN | 101199413 | 6/2008 |

(Continued)

OTHER PUBLICATIONS

International Search Report for International Application No. PCT/US2013/052476 issued by the Korean Intellectual Property Office on Nov. 1, 2013.

(Continued)

*Primary Examiner* — Giovanna C Wright
(74) *Attorney, Agent, or Firm* — Stradley Ronon Stevens & Young, LLP (57) ABSTRACT

A remotely actuated clamping device for a borehole seismic sensing system. The remotely actuated clamping device includes a clamping mechanism configured to engage a surface of a borehole by actuation of the clamping mechanism. The remotely actuated clamping device also includes a fluid based actuator configured to actuate the clamping mechanism. The fluid based actuator includes a chamber configured to be kept at a pressure that is isolated from an ambient pressure of the borehole. The fluid based actuator also includes a piston within the chamber. The chamber receives a pressurized fluid to move the piston within the chamber to actuate the clamping mechanism. The pressure used to actuate the clamping mechanism is independent of the ambient pressure of the borehole. Also disclosed are methods of operating the device.

20 Claims, 5 Drawing Sheets

(51) Int. Cl.
*E21B 23/01* (2006.01)
*G01V 11/00* (2006.01)
*G01V 1/52* (2006.01)

(56) References Cited

U.S. PATENT DOCUMENTS

| | | | |
|---|---|---|---|
| 3,504,743 A | 4/1970 | Winters | |
| 3,683,326 A | 8/1972 | White | |
| 3,831,443 A * | 8/1974 | Planche | E21B 17/1021 137/614.05 |
| 4,155,005 A | 5/1979 | Knowlton et al. | |
| 4,255,015 A | 3/1981 | Adams et al. | |
| 4,292,628 A | 9/1981 | Sadler | |
| 4,428,422 A * | 1/1984 | Laurent | E21B 17/1021 166/212 |
| 4,648,039 A | 3/1987 | Devaney et al. | |
| 4,800,267 A | 1/1989 | Freal et al. | |
| 4,819,760 A * | 4/1989 | Petermann | E21B 23/04 166/212 |
| 4,826,322 A | 5/1989 | Philips | |
| 4,879,755 A | 11/1989 | Stolarczyk et al. | |
| 4,893,930 A | 1/1990 | Garrett et al. | |
| 4,994,668 A | 2/1991 | Lagakos et al. | |
| 5,011,262 A | 4/1991 | Layton | |
| 5,051,799 A | 9/1991 | Paul et al. | |
| 5,172,117 A | 12/1992 | Mills et al. | |
| 5,212,354 A | 5/1993 | Miller et al. | |
| 5,227,857 A | 7/1993 | Kersey | |
| 5,242,020 A * | 9/1993 | Cobern | E21B 17/1021 166/254.2 |
| 5,367,376 A | 11/1994 | Lagakos et al. | |
| 5,397,891 A | 3/1995 | Udd et al. | |
| 5,493,390 A | 2/1996 | Varasi et al. | |
| 5,680,489 A | 10/1997 | Kersey | |
| 5,712,932 A | 1/1998 | Alexander et al. | |
| 5,798,834 A | 8/1998 | Brooker | |
| 5,986,749 A | 11/1999 | Wu et al. | |
| 6,104,492 A | 8/2000 | Giles et al. | |
| 6,157,711 A | 12/2000 | Katz | |
| 6,281,976 B1 | 8/2001 | Taylor et al. | |
| 6,315,075 B1 * | 11/2001 | Nakajima | E21B 23/01 166/206 |
| 6,328,837 B1 | 12/2001 | Vohra et al. | |
| 6,381,048 B1 | 4/2002 | Chraplyvy et al. | |
| 6,453,022 B1 | 9/2002 | Weinman, Jr. | |
| 6,654,521 B2 | 11/2003 | Sheng et al. | |
| 6,819,812 B2 | 11/2004 | Kochergin et al. | |
| 6,891,621 B2 | 5/2005 | Berg et al. | |
| 6,900,726 B2 | 5/2005 | Graves | |
| 7,013,729 B2 | 3/2006 | Knudsen et al. | |
| 7,282,697 B2 | 10/2007 | Thomas et al. | |
| 7,683,312 B2 | 3/2010 | Goldner et al. | |
| 7,840,105 B2 | 11/2010 | Goldner et al. | |
| 7,994,469 B2 | 8/2011 | Goldner et al. | |
| 7,999,946 B2 | 8/2011 | Andersen et al. | |
| 8,153,956 B2 | 4/2012 | Goldner et al. | |
| 8,165,469 B1 | 4/2012 | Moslehi et al. | |
| 8,240,207 B2 | 8/2012 | Andersen et al. | |
| 8,330,096 B2 | 12/2012 | Goldner et al. | |
| 8,401,354 B2 | 3/2013 | Goldner et al. | |
| 2002/0063866 A1 | 5/2002 | Kersey et al. | |
| 2002/0064331 A1 | 5/2002 | Davis et al. | |
| 2002/0064332 A1 | 5/2002 | Martin | |
| 2003/0094281 A1 | 5/2003 | Tubel | |
| 2003/0145654 A1 | 8/2003 | Knudsen et al. | |
| 2004/0046111 A1 | 3/2004 | Swierkowski | |
| 2004/0060697 A1 | 4/2004 | Tilton | |
| 2004/0114463 A1 | 6/2004 | Berg et al. | |
| 2004/0246816 A1 | 12/2004 | Ogle | |
| 2005/0076713 A1 | 4/2005 | Knudsen | |
| 2005/0097955 A1 | 5/2005 | Berg et al. | |
| 2005/0111788 A1 | 5/2005 | Tsuyama | |
| 2006/0120675 A1 | 6/2006 | Goldner et al. | |
| 2007/0024857 A1 | 2/2007 | Menezo | |
| 2007/0065149 A1 | 3/2007 | Stevens et al. | |
| 2008/0137589 A1 | 6/2008 | Barrett | |
| 2009/0101800 A1 | 4/2009 | Goldner et al. | |
| 2009/0140852 A1 | 6/2009 | Stolarczyk et al. | |
| 2009/0210168 A1 | 8/2009 | Vincelette | |
| 2010/0005860 A1 | 1/2010 | Coudray et al. | |
| 2010/0219334 A1 | 9/2010 | LeGrand | |
| 2012/0006109 A1 | 1/2012 | Andersen et al. | |
| 2012/0216615 A1 | 8/2012 | Andersen et al. | |
| 2012/0227504 A1 | 9/2012 | Goldner et al. | |
| 2012/0257208 A1 | 10/2012 | Andersen et al. | |
| 2012/0257209 A1 | 10/2012 | Andersen et al. | |
| 2013/0025375 A1 | 1/2013 | Goldner et al. | |
| 2013/0034351 A1 | 2/2013 | Goldner et al. | |
| 2013/0099104 A1 | 4/2013 | Goldner et al. | |
| 2013/0162432 A1 | 6/2013 | Goldner et al. | |
| 2013/0201484 A1 | 8/2013 | Goldner et al. | |

FOREIGN PATENT DOCUMENTS

| | | |
|---|---|---|
| JP | 2001-221684 | 8/2001 |
| JP | 2006-172339 | 6/2006 |
| JP | 2007-232515 | 9/2007 |
| KR | 10-1997-0002776 | 1/1997 |
| KR | 10-2002-0008457 | 1/2002 |
| WO | 99/05493 | 2/1999 |
| WO | 2007/036721 | 4/2007 |
| WO | 2011/050227 | 4/2011 |
| WO | 2011/050275 | 4/2011 |
| WO | 2011/103032 | 8/2011 |
| WO | 2011/103271 | 8/2011 |
| WO | 2011/103290 | 8/2011 |
| WO | 2012/103085 | 8/2012 |
| WO | 2012/122352 | 9/2012 |
| WO | 2013/028515 | 2/2013 |

OTHER PUBLICATIONS

1st Office Action dated May 31, 2013 (with English translation) issued by the State Intellectual Property Office (SIPO) of the People's Republic of China for Chinese Patent Application No. 201080047796.6.
International Search Report for International Application No. PCT/US2010/025248 issued by the Korean Intellectual Property Office on Oct. 11, 2011.
International Search Report for International Application No. PCT/US2010/053659 issued by the Korean Intellectual Property Office on Aug. 2, 2011.
International Search Report for International Application No. PCT/US2010/053763 issued by the Korean Intellectual Property Office on Jul. 28, 2011.
International Search Report for International Application No. PCT/US2011/024465 issued by the Korean Intellectual Property Office on Oct. 27, 2011.
International Search Report for International Application No. PCT/US2011/025206 issued by the Korean Intellectual Property Office on Oct. 17, 2011.
International Search Report for International Application No. PCT/US2012/022356 issued by the Korean Intellectual Property Office on Sep. 3, 2012.
International Search Report for International Application No. PCT/US2012/028224 issued by the Korean Intellectual Property Office on Sep. 24, 2012.
International Search Report for International Application No. PCT/US2012/051338 issued by the Korean Intellectual Property Office on Mar. 14, 2013.
International Search Report for International Application No. PCT/US2013/039498 issued by the Korean Intellectual Property Office on Sep. 16, 2013.
Tang et al., "Rapidly Tunable Optical Add-Drop Multiplexer (OADM) Using a Static-Strain-Induced Grating in LiNbO3", Journal of Lightwave Technology, vol. 21, No. 1, pp. 236-245, Jan. 31, 2003, See Abstract and Figures 1-2, pp. 236-237.

* cited by examiner

REMOTELY ACTUATED CLAMPING DEVICES FOR BOREHOLE SEISMIC SENSING SYSTEMS AND METHODS OF OPERATING THE SAME

RELATED APPLICATION

This application claims the benefit of priority to U.S. Provisional Patent Application Ser. No. 61/676,565, filed on Jul. 27, 2012, the contents of which are incorporated in this application by reference.

TECHNICAL FIELD

The field of the invention relates to an apparatus and method for clamping a borehole seismic sensor (e.g., an accelerometer, a geophone sensor, etc.) within a borehole (e.g., a well bore) to ensure good coupling to the borehole wall, down hole formations, or both.

BACKGROUND OF THE INVENTION

A sonde is an instrument probe used to automatically obtain information (e.g., vibration, pressure, temperature, etc.) about its surroundings (e.g., underground, under water, in the atmosphere, and the like). Seismic sensors are routinely placed within well bores to obtain information regarding the properties, structure, and activity of the earth in the area surrounding the well bore. Seismic sensor sondes may be individual units or multi-sonde tools linked together via, for example, a cable. In order to obtain accurate seismic data, the sensors or sondes are desirably rigidly coupled to the well bore in order to retrieve the seismic data. Often, the outer surface of a well bore is cemented to the surrounding earth, so that by securing the sensors to the well bore, the sensors are in effect coupled to the earth.

The sensors are typically lowered into the well bore many hundreds or even thousands of feet before they are clamped into position. Therefore, it is desirable that the clamp have a low drag as it is lowered into position. Typically, the clamping mechanism of a sensor is in the retracted position while lowering the sensor array/string to the desired position. The clamping mechanism or mechanisms is or are actuated (e.g., extended) to lock the sensor or sensors in place after the desired depth is reached. The activation and deactivation of the clamping mechanism is usually performed remotely by an operator at the surface. Actuation can be electronic, hydraulic, pneumatic, or accomplished using any other suitable mechanism.

Another key parameter of a borehole clamping mechanism is the clamping force versus the total weight of the sensor and housing. It is generally desirable within the industry to have a clamping force-to-weight ratio of 10, whereas clamping forces less than that ratio may not provide an acceptable level of mechanical coupling to the borehole surface. In certain applications, passive bow spring clamps and/or magnetic clamps having a much lower clamping force-to-weight ratio are adequate. These types of clamps are always engaged both during installation and during data collection. As a result of the clamps always being engaged, the total drag force during installation must be overcome by a weight at the bottom of the sensor array or electric tractor; however, there are practical limits to the amount of weight that can be added to the bottom of the sensor array, and tractors require high electrical current, necessitating copper conductors within the entire length of the sensing array and lead cable.

For borehole clamps that are not passive (i.e., they rely on a remotely actuated mechanism to engage and disengage the clamping force), several variations exist. The most widely used clamp employs an integral electric motor and lead screw arrangement to position a clamping mechanism. Advantages of such an arrangement include a high clamping force and a simple design. Disadvantages of such an arrangement include the need for electrical power in the borehole, and design considerations to avoid sparks or electrical discharges down hole. Most such electrically powered systems have a short lifetime in high temperature borehole environments (e.g., above 150° C.).

Clamping mechanisms that rely on hydraulic actuation have also been used. Such mechanisms include expandable bladders or actuator arms actuated by hydraulic pressure. Advantages of such hydraulic mechanisms include no electrical power down hole and a high clamping force. Disadvantages of such hydraulic mechanisms include the hydrostatic effects of the wellbore and the height of fluid in the hydraulic line which could be thousands of feet. Alternatively, a high pressure gas can be used to actuate a downhole clamp, but the gas pressure must be high enough to overcome the down-hole pressure, which may be tens of thousands of pounds per square inch (psi).

One method that is currently being used to overcome the hydrostatic effects due to the height of the fluid column in a hydraulically actuated system is to use the well bore fluid as the hydraulic fluid. Such systems typically employ a check valve at the bottom of the hydraulic line that allows the well bore fluid to flow into the hydraulic line until the water level in the hydraulic line matches the water level in the well bore. Pneumatic pressure applied from the surface to the hydraulic line closes the check valve and pressurizes the hydraulic line, thus actuating the clamping force. To release the clamping force, a substantially higher and overpressure is applied which releases a blowout plug which relieves the hydraulic pressure. These systems tend to be unreliable, however, and are susceptible to clogging of the valve with wellbore debris.

With the advent of fiber optic down-hole seismic sensors, electronics and electrical power are often unavailable down hole. Thus, it would be desirable to provide a simple, high-performance borehole clamping system that does not require down-hole electronics or electrical power, and that can operate equally well at both high and low pressures and both high and low temperatures. There remains a need in the industry for such a system.

BRIEF SUMMARY OF THE INVENTION

To meet this and other needs, and according to an exemplary embodiment of the present invention, a remotely actuated clamping device for a borehole seismic sensing system is provided. The remotely actuated clamping device includes a clamping mechanism configured to engage a surface of a borehole by actuation of the clamping mechanism. The remotely actuated clamping device also includes a fluid based actuator configured to actuate the clamping mechanism. The fluid based actuator includes a chamber configured to be kept at a pressure that is isolated from an ambient pressure of the borehole. The fluid based actuator also includes a piston within the chamber. The chamber receives a pressurized fluid to move the piston within the chamber to actuate the clamping mechanism. The pressure used to actuate the clamping mechanism is independent of the ambient pressure of the borehole.

According to another exemplary embodiment of the present invention, another remotely actuated clamping device for a borehole seismic sensing system is provided. The remotely actuated clamping device includes a clamping mechanism configured to engage an inside surface of a borehole due to actuation of the clamping mechanism. The remotely actuated clamping device also includes a fluid based actuator configured to actuate the clamping mechanism. The fluid based actuator has a chamber including a piston dividing the chamber into a first region and a second region. The fluid based actuator also has a connecting rod assembly extending through an entire length of the chamber and beyond each of two sides of the chamber. The connecting rod assembly is coupled to the piston such that movement of the piston within the chamber results in movement of the connecting rod assembly. The connecting rod assembly is engaged with the clamping mechanism at a position outside of the chamber such that the clamping mechanism is configured to be actuated by motion of the connecting rod assembly. An area of the fluid based actuator outside of the chamber is configured to be exposed to an ambient pressure of the wellbore.

According to yet another exemplary embodiment of the present invention, a method of remotely operating a clamping device within a borehole is provided. The method includes the steps of: (a) lowering an array of one or more seismic sensing assemblies into a borehole; and (b) actuating a clamping mechanism of the seismic sensing assembly such that the clamping mechanism is engaged against a surface of the borehole, wherein the clamping mechanism is actuated by applying a fluid pressure to a fluid based actuator of the seismic sensing assembly, wherein the pressure used to actuate the clamping mechanism is independent of the ambient pressure of the borehole.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

As will be explained in greater detail below, according to certain exemplary embodiments of the present invention, improved clamping devices for borehole seismic sensors are provided. Exemplary clamping devices for securing downhole seismic sensors to the inside of a borehole (e.g., a well bore) are provided which improve the mechanical coupling of seismic disturbances from the earth surrounding the borehole to the sensor. Such a clamping device is powered by a fluid based (e.g., pneumatic or hydraulic) actuator that is pressure-compensated to minimize the effects of ambient pressure. The clamping device may be integral to a sonde (e.g., a sensor housing) or it can be fastened to an existing sensor housing. A borehole sensor array includes a string of one or more seismic sensor sondes, each containing one or more seismic sensors. Each of the seismic sensor sondes and/or each of the seismic sensors may include one or more of the inventive clamping devices. The seismic sensors may desirably include a housing to protect the sensors from borehole pressure and fluids.

As provided above, conventional fluid based actuators may have to overcome the effects of the height of the wellbore fluid column and the height of the fluid in the fluid line which could be tens of thousands of feet. Thus, the pressure required can easily be thousands of psi. According to the present invention, because the fluid based actuator is pressure compensated, a substantially reduced pressure (e.g., on the order of hundreds of psi) may be used to simply overcome a spring in the actuator chamber. This is because the fluid of the borehole (e.g., oil, gas, etc.) acts on both ends of the connecting rod/beam, except within the chamber as described below), and as such, there is no need to overcome the ambient pressure level.

Figure 1A:
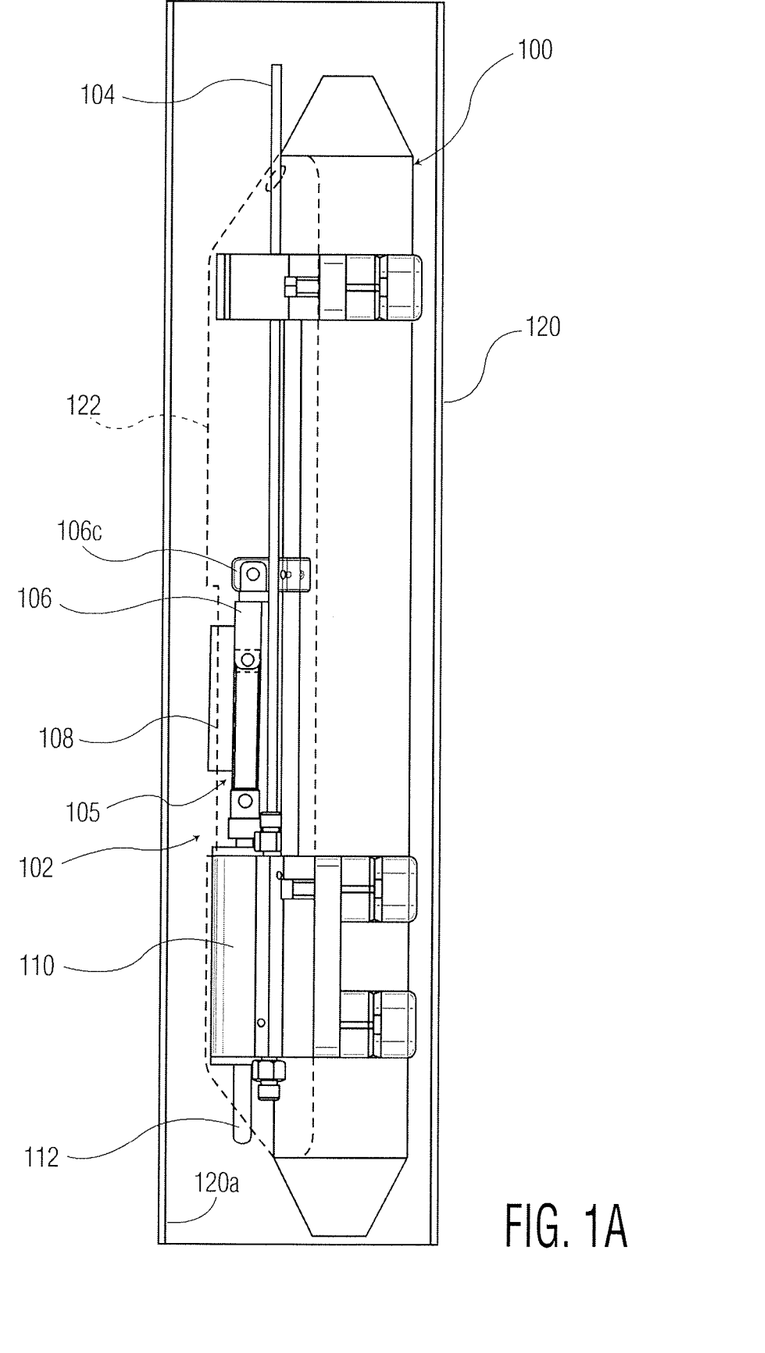
FIG. 1A is a side view diagram of a seismic sensor in a borehole, with a clamping mechanism of the seismic sensor in a retracted position, in accordance with an exemplary embodiment of the present invention.
Figure 1B:
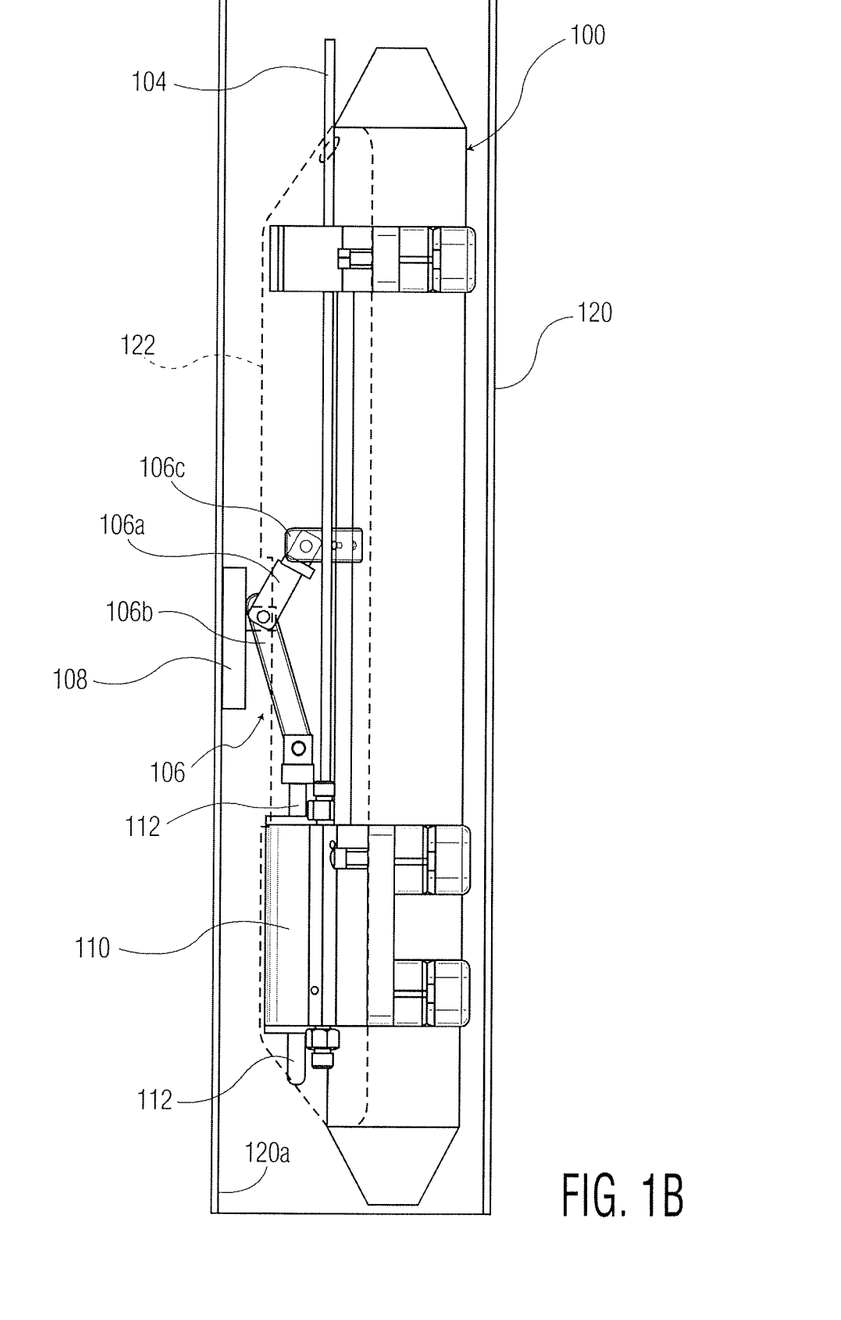
FIG. 1B is a side view diagram of the seismic sensor of FIG. 1A with the clamping mechanism in an extended position.

Referring to FIGS. 1A and 1B, a seismic sensor 100 (also known as a seismic sensing assembly) is illustrated in a borehole 120. As will be understood by those skilled in the art, many details of seismic sensor 100 are omitted for simplicity. Further, as will be understood by those skilled in the art, a plurality of seismic sensors 100 may be combined in an array (e.g., along a cable) within borehole 120. A fluid line 104 (e.g., a pneumatic or hydraulic fluid line) carries a fluid (e.g., gas such as nitrogen or air, or a liquid such as a hydraulic fluid) to a clamping device 102.

Clamping device 102 is secured to seismic sensor 100 (e.g., using one or more securing mechanisms). Clamping device 102 has a clamping mechanism 105 (including a clamp arm 106 and a foot member 108) and a fluid based actuator 110 (e.g., a pneumatic actuator 110) that is configured to operate clamp arm 106 through a connecting rod 112. More specifically (when the fluid based actuator is pneumatic as described herein), an increase in pneumatic pressure provided by fluid line 104 operates fluid based actuator 110, which in turn moves connecting rod 112 (e.g., through motion of a piston in fluid based actuator 110, not shown in FIG. 1A or 1B), which in turn pivotally activates (i.e., extends) clamp arm 106. When clamp arm 106 is extended, as shown in FIG. 1B (with clamp arm 106 in an extended position, as opposed to the retracted position of FIG. 1A), foot member 108 coupled (directly or indirectly) to clamp arm 106 presses against an inside surface 120a of borehole 120 (e.g., a wall of a well bore). In the exemplary embodiment illustrated in FIGS. 1A and 1B, clamp arm 106 is a pivoting linkage arm that includes links 106a, 106b, and 106c (with pins disposed between the links). An optional cover 122 is illustrated to protect many of the elements of seismic sensor 100, for example, during lowering of seismic sensor 100 into borehole 120 (or retrieval from borehole 120).

In accordance with various exemplary embodiments of the present invention, the pressure seen by the various elements of seismic sensor 100, including the ends of connecting rod 112, but excluding a chamber (including a piston) within fluid based actuator 110, is an ambient pressure of borehole 120. This reduces the magnitude of the fluid pressure used to actuate fluid based actuator 110 for actuating the clamping mechanism because the ambient pressure of borehole 120 does not need to be overcome by the applied fluid pressure.

Figure 2A:
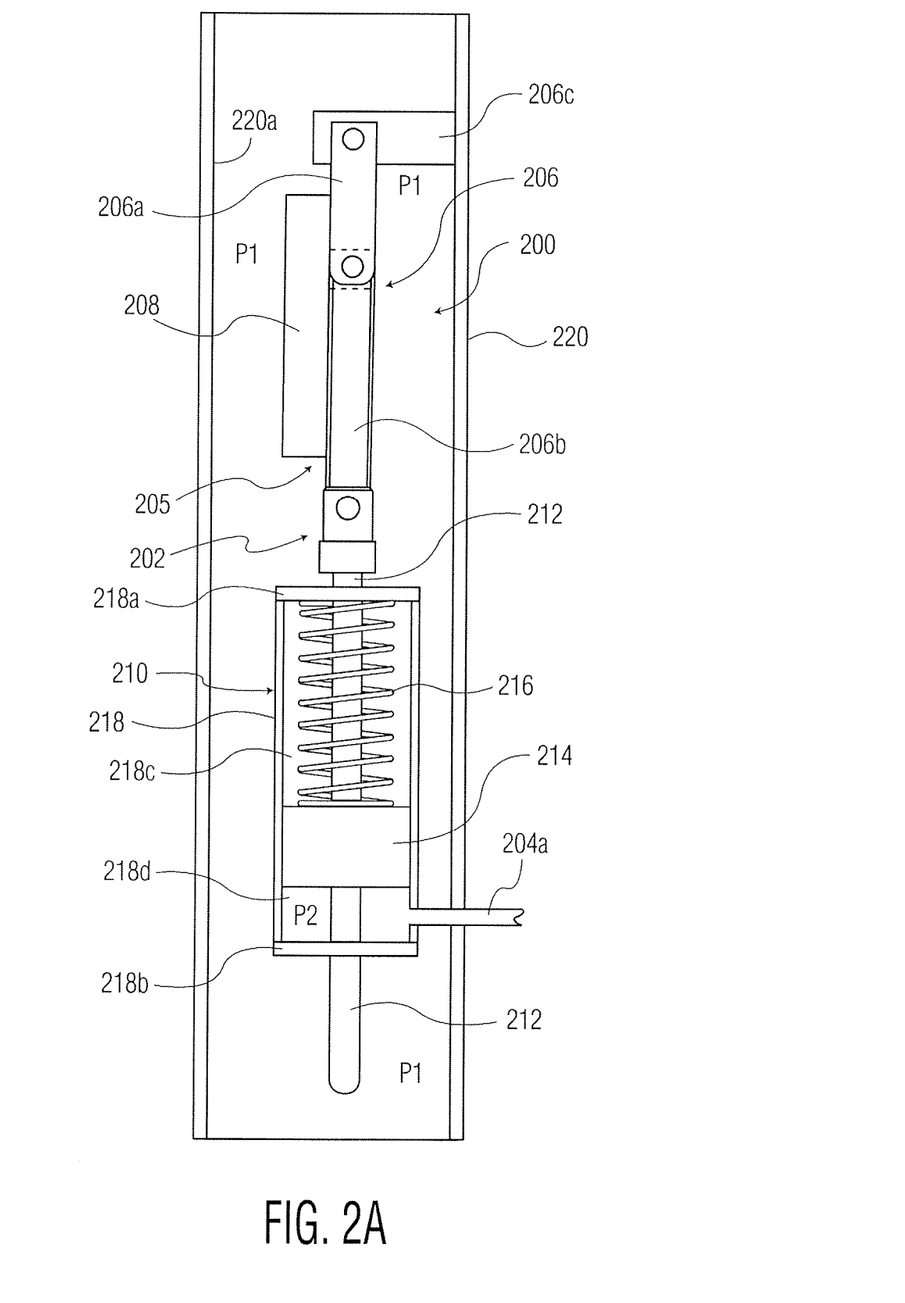
FIG. 2A is a block diagram side view of a portion of a seismic sensor in a borehole, with a clamping mechanism of the seismic sensor in a retracted position, in accordance with an exemplary embodiment of the present invention.
Figure 2B:
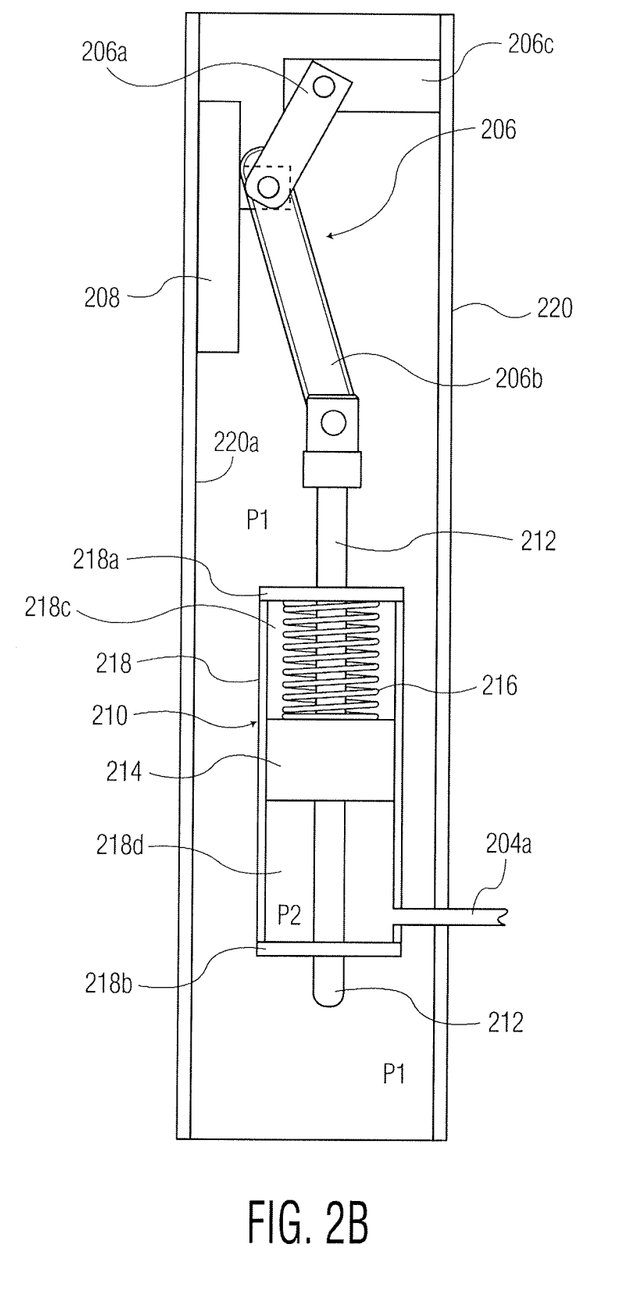
FIG. 2B is a side view diagram of the seismic sensor of FIG. 2A with the clamping mechanism in an extended position.

Fluid based actuator 110 may have a number of different configurations. FIGS. 2A and 2B illustrate an exemplary configuration. In FIGS. 2A and 2B, certain of the reference numerals are the same as for like elements in FIGS. 1A and 1B, except that the reference numerals begin with the number "2" instead of the number "1." In FIGS. 2A and 2B, only a portion of a seismic sensor 200 is illustrated, that is, primarily a fluid based actuator 210 and a clamping mechanism 205 (both being part of a clamping device 202) within a borehole 220. Other elements of the seismic sensor are omitted for simplicity.

Fluid based actuator 210 shown in FIGS. 2A and 2B (referred to hereinafter as a pneumatic actuator) includes a chamber 218 and a piston 214 within chamber 218. Chamber 218 is defined between walls 218a, 218b. Piston 214 divides chamber 218 into a first region 218c and a second region 218d. A pneumatic fluid is received by region 218d via a pneumatic fluid line 204a. Region 218c includes a restoring spring 216. A connecting rod 212 extends through the entire length of chamber 218. One end of connecting rod 212 extends beyond wall 218b. The opposite end of connecting rod 212 extends beyond wall 218a, and is coupled (either directly or indirectly, as desired) to clamping mechanism 205. Clamping mechanism 205 has a clamp arm 206 (including links 206a, 206b, and 206c with pins disposed between the links) and a foot member 208.

In FIGS. 2A and 2B, an ambient pressure P1 within borehole 220 is seen by clamp arm 206, foot member 208, and the end portions of connecting rod 212 outside of chamber 210. Thus, in order to actuate clamp arm 206, a pneumatic pressure is applied via fluid line 204a into region 218d of chamber 218. The pressure in region 218d is a pressure P2, which is isolated from ambient pressure P1. When the pressure within region 218d reaches a level needed to move piston 214 within chamber 218, restoring spring 216 is compressed as shown in FIG. 2B. Connecting rod 212 is connected (either directly or indirectly) to piston 214, and as such, when piston 214 moves within chamber 218 connecting rod 212 also moves. In FIG. 2A, clamp arm 206 is in a retracted position. The movement of connecting rod 212 causes pivoting of pivoting clamp arm 206 into the extended position shown in FIG. 2B. Extension of clamp arm 206 causes foot member 208 to press against inside surface 220a of borehole 220. When at least a portion of the fluid pressure is removed (e.g., vented) from region 218d, restoring spring 216 restores clamp arm 206 to the retracted position shown in FIG. 2A.

The devices illustrated in FIGS. 1A, 1B, 2A, and 2B, and described above, are exemplary in nature. Alternative arrangements and elements are contemplated. For example, connecting rods 112 and 212 may have varying cross-sectional shapes such as round, square, rectangular, etc. Further, a connecting rod (also referred to as a connecting rod assembly) may be a single piece or multiple pieces coupled together, either directly or indirectly. Likewise, although linkage-based clamp arms are illustrated (elements 106 and 206), alternative types of clamping structure may be actuated/driven by the fluid based actuator.

Figure 3:
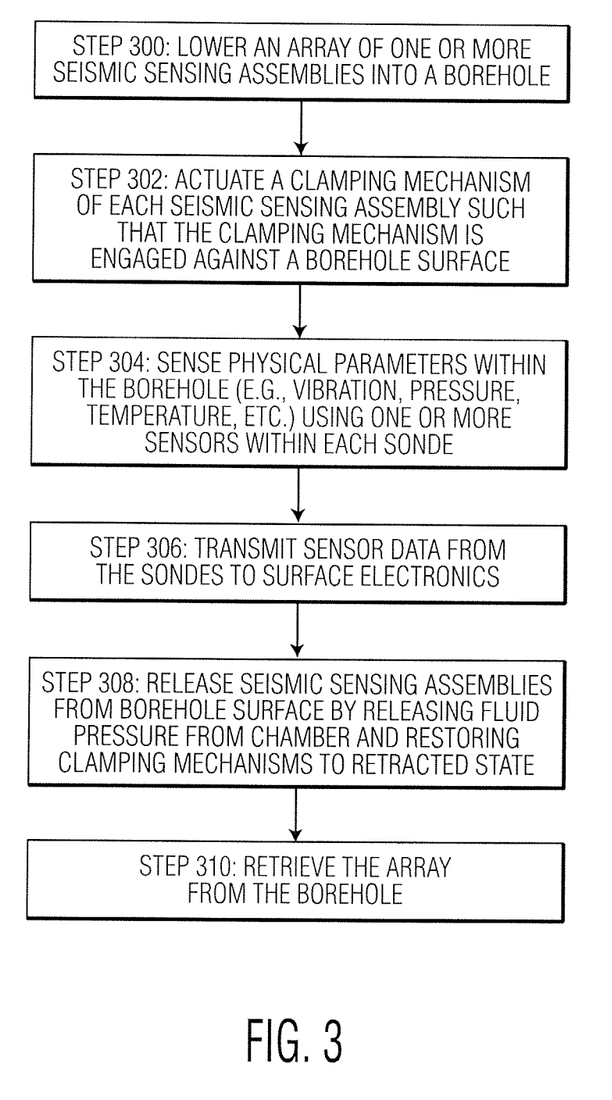
FIG. 3 is a flow diagram illustrating a method of remotely operating a clamping device within a borehole in accordance with an exemplary embodiment of the present invention.

FIG. 3 is a flow diagram illustrating the steps of a method for remotely operating a clamping device (such as the devices shown in FIGS. 1A, 1B, 2A, and 2B) within a borehole in accordance with an exemplary embodiment of the present invention. As will be appreciated by those skilled in the art, certain steps may be rearranged or omitted, or additional steps may be added, within the scope of the present invention. At Step 300, an array of one or more seismic sensing assemblies (e.g., sondes) is lowered into a borehole. At Step 302, a clamping mechanism (e.g., mechanisms 105, 205 as shown in FIGS. 1A and 2A) of each seismic sensing assembly is actuated such that each clamping mechanism is engaged against a borehole surface (e.g., foot members 108, 208 engaged against borehole surfaces 120a, 220a, as shown in FIGS. 1B and 2B). At Step 304, physical parameters within the borehole (e.g., vibration, pressure, temperature, etc.) are sensed using one or more sensors within each sonde. The sensors may be, for example, fiber optic sensors. Such fiber optic sensors may include fiber optic transducers, accelerometers, etc. At Step 306, the sensed physical parameter data are transmitted from the seismic sensing assemblies to surface electronics (e.g., such as interrogator-based electronics) outside of the borehole. For example, such data may be transmitted using fiber optic cables from the borehole to the surface electronics. At Step 308, the seismic sensing assemblies are released from the borehole surface by releasing fluid pressure from a chamber of each fluid based actuator, thereby restoring the clamping mechanisms to their retracted state (e.g., using a restoring spring such as spring 216 shown in FIGS. 2A and 2B). At Step 310, the array of seismic sensing assemblies is retrieved from the borehole.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A remotely actuated clamping device for a borehole seismic sensing system comprising:
   a clamping mechanism configured to engage a surface of a borehole by actuation of the clamping mechanism; and
   a fluid based actuator configured to actuate the clamping mechanism, the fluid based actuator including a chamber configured to be kept at a pressure that is isolated from an ambient pressure of the borehole, the fluid based actuator also including a piston within the chamber, the chamber receiving a pressurized fluid to move the piston within the chamber to actuate the clamping mechanism,
   wherein a pressure used to actuate the clamping mechanism is independent of the ambient pressure of the borehole,
   wherein the clamping mechanism includes a pivoting linkage arm, the pivoting linkage arm including a plurality of pivotally connected links between a first end of the pivoting linkage arm and a second end of the pivoting linkage arm, the first end of the pivoting linkage arm being connected to a connecting rod assembly that extends through the chamber, and a second end of the pivoting linkage arm being connected to another portion of the remotely actuated clamping device, the clamping mechanism also including a foot member connected to the pivoting linkage arm at a position between the first end of the pivoting linkage arm and a second end of the pivoting linkage arm.

2. The remotely actuated clamping device of claim 1 wherein the fluid based actuator is pneumatically actuated or hydraulically actuated.

3. The remotely actuated clamping device of claim 1 wherein the fluid based actuator includes a restoring spring in the chamber, the restoring spring being configured to return the clamping mechanism to a non-actuated position upon removal of at least a portion of the pressurized fluid from the chamber.

4. The remotely actuated clamping device of claim 1 wherein the chamber includes a first region on one side of the piston, and a second region on another side of the piston, the first region including a restoring spring, the second region being configured to receive the pressurized fluid.

5. The remotely actuated clamping device of claim 1 wherein the pivoting linkage arm is for engaging the clamping mechanism against the surface of the borehole and locking the remotely actuated clamping device into a position within the borehole.

6. The remotely actuated clamping device of claim 1 wherein the connecting rod assembly is coupled to the piston such that the connecting rod assembly moves with the piston.

7. The remotely actuated clamping device of claim 6 wherein the connecting rod assembly is engaged with the clamping mechanism at a position outside of the chamber such that the clamping mechanism is configured to be actuated by motion of the connecting rod.

8. The remotely actuated clamping device of claim 1 wherein the pivoting linkage arm is to pivot and press the foot member against the surface of the borehole.

9. A remotely actuated clamping device for a borehole seismic sensing system comprising:
a clamping mechanism configured to engage an inside surface of a borehole due to actuation of the clamping mechanism; and
a fluid based actuator configured to actuate the clamping mechanism, the fluid based actuator having a chamber including a piston dividing the chamber into a first region and a second region, the fluid based actuator also having a connecting rod assembly extending through an entire length of the chamber and beyond each of two sides of the chamber, the connecting rod assembly being coupled to the piston such that movement of the piston within the chamber results in movement of the connecting rod assembly, wherein the connecting rod assembly is engaged with the clamping mechanism at a position outside of the chamber such that the clamping mechanism is configured to be actuated by motion of the connecting rod,
wherein an area of the fluid based actuator outside of the chamber is configured to be exposed to an ambient pressure of the wellbore,
wherein the clamping mechanism includes a pivoting linkage arm, the pivoting linkage arm including a plurality of pivotally connected links between a first end of the pivoting linkage arm and a second end of the pivoting linkage arm, the first end of the pivoting linkage arm being connected to the connecting rod assembly, and a second end of the pivoting linkage arm being connected to another portion of the remotely actuated clamping device, the clamping mechanism also including a foot member connected to the pivoting linkage arm at a position between the first end of the pivoting linkage arm and a second end of the pivoting linkage arm.

10. The remotely actuated clamping device of claim 9 wherein a pressure used to actuate the clamping mechanism is independent of the ambient pressure of the borehole.

11. The remotely actuated clamping device of claim 10 wherein the pivoting linkage arm is configured to pivot and press the foot member against the surface of the borehole.

12. The remotely actuated clamping device of claim 9 wherein the fluid based actuator is pneumatically or hydraulically actuated.

13. The remotely actuated clamping device of claim 9 wherein the fluid based actuator includes a restoring spring in the chamber, the restoring spring being configured to return the clamping mechanism to a non-actuated position upon removal of at least a portion of the pressurized fluid from the chamber.

14. The remotely actuated clamping device of claim 9 wherein the chamber includes the first region on one side of the piston, and the second region on another side of the piston, the first region including a restoring spring, the second region being configured to receive a pressurized fluid to move the piston.

15. The remotely actuated clamping device of claim 9 wherein the pivoting linkage arm is for engaging the clamping mechanism against the surface of the borehole and locking the remotely actuated clamping device into a position within the borehole.

16. A method of remotely operating a clamping device within a borehole, and the method comprising the steps of:
(a) lowering an array of one or more seismic sensing assemblies into a borehole; and
(b) actuating a clamping mechanism of the seismic sensing assembly such that the clamping mechanism is engaged against a surface of the borehole, wherein the clamping mechanism is actuated by applying a fluid pressure to a fluid based actuator of the seismic sensing assembly, wherein the pressure used to actuate the clamping mechanism is independent of the ambient pressure of the borehole, the fluid based actuator including a chamber configured to be kept at a pressure that is isolated from an ambient pressure of the borehole, the fluid based actuator also including a piston within the chamber,
wherein the clamping mechanism includes a pivoting linkage arm, the pivoting linkage arm including a plurality of pivotally connected links between a first end of the pivoting linkage arm and a second end of the pivoting linkage arm, the first end of the pivoting linkage arm being connected to a connecting rod assembly that extends through the chamber, and a second end of the pivoting linkage arm being connected to another portion of the clamping device, the clamping mechanism also including a foot member connected to the pivoting linkage arm at a position between the first end of the pivoting linkage arm and a second end of the pivoting linkage arm.

17. The method of claim 16 wherein step (b) includes pneumatically or hydraulically actuating the clamping mechanism.

18. The method of claim 16 further comprising the step of returning the clamping mechanism to a non-actuated position using a restoring spring provided in the chamber of the fluid based actuator.

19. The method of claim 16 wherein step (b) includes applying the fluid pressure to a second region of the chamber of the fluid based actuator, the chamber being divided into a first region on a first side of the piston within the chamber and the second region on an opposite side of the piston within the chamber, the first region including a restoring spring.

20. The method of claim 16 wherein step (b) includes actuating the pivoting linkage arm of the clamping mechanism to engage the clamping mechanism against the surface of the borehole.

* * * * *